(12) United States Patent
McGregor et al.

(10) Patent No.: US 6,306,307 B1
(45) Date of Patent: Oct. 23, 2001

(54) PERVAPORATION APPARATUS AND METHOD

(75) Inventors: Ian R. McGregor, Mississauga; John G. Wilson, Oakville; Alia A. Hamza; Mark E. Nye, both of Mississauga, all of (CA)

(73) Assignee: Fielding Chemical Technologies, Inc.

( * ) Notice: Subject to any disclaimer, the term of this patent is extended or adjusted under 35 U.S.C. 154(b) by 0 days.

(21) Appl. No.: 09/521,123

(22) Filed: Mar. 7, 2000

(51) Int. Cl.[7] .......................... B01D 61/36; B01D 61/58
(52) U.S. Cl. ......................... 210/640; 95/45; 96/7; 210/182; 210/257.2; 210/321.75; 210/321.84; 210/636; 210/774; 210/806; 202/176; 203/39
(58) Field of Search ........................ 210/175, 180, 210/181, 182, 195.2, 257.2, 258, 259, 321.69, 321.75, 321.84, 327, 330, 636, 640, 650, 774, 805, 806, 808, 226–228, 406, 416.1; 96/7, 11; 95/45; 202/176, 185.1; 203/39

(56) References Cited

U.S. PATENT DOCUMENTS

| | | | |
|---|---|---|---|
| 3,948,778 | 4/1976 | Muller | 210/330 |
| 4,897,192 | 1/1990 | Lawrence | 210/330 |
| 4,936,954 | * 6/1990 | Sander | 210/321.84 |
| 5,227,064 | 7/1993 | Strid | 210/327 |
| 5,389,255 | 2/1995 | Danziger et al. | 210/321.84 |
| 5,437,796 | * 8/1995 | Bruschke et al. | 210/640 |
| 5,445,731 | * 8/1995 | Tuohey et al. | 210/257.1 |
| 5,536,405 | 7/1996 | Myrna et al. | 210/321.84 |
| 5,620,605 | 4/1997 | Moller | 210/650 |
| 5,641,402 | 6/1997 | Kohonen et al. | 210/330 |

OTHER PUBLICATIONS

A Break–Even Analysis of Distillation—Membrane Hybrids, AIChE Journal, Jan. 1998, vol. 44, No. 1, pp. 93–105.
Separating Azeotropic Mixtures, pp. 12–15 Sulzer Technical Review 3/98.

* cited by examiner

*Primary Examiner*—Joseph W. Drodge
(74) *Attorney, Agent, or Firm*—Young & Basile

(57) ABSTRACT

Pervaporation or vapor permeation apparatus and method having a separator module located in an unpressurized tank. The module has a plurality of stacked, disk-like separator elements mounted on a central, axial permeate removal tube. The separator elements have a central permeate transport plate, a pervaporation membrane enveloping the permeate transport plate and annular sealing rings located between adjacent membranes, so that fluid has to pass through the membranes to enter the permeate removal tube. A vacuum applied to the permeate removal tube draws permeate through the pervaporation membranes and permeate transport plates into the permeate removal tube. The permeate can be condensed right in the permeate removal tube by direct contact condensation using chilled liquid permeate, however an external condenser can be used. Jets of solution or bubbles of permeate vapor passing between the separator elements reduce or prevent concentration polarization.

37 Claims, 10 Drawing Sheets

PERVAPORATION APPARATUS AND METHOD

FIELD OF THE INVENTION

The present invention relates to the field of fluid separations whereby fluid components are separated from a mixture by pervaporation or vapor permeation.

BACKGROUND OF THE INVENTION

A variety of commercial processes rely on fluid separation techniques using membranes in order to separate one or more desirable or undesirable fluid components from a mixture. Separation processes using membranes are used for the separation of water from mixtures with organic liquids, for the separation of volatile organic compounds from aqueous solutions, for the separation of organic components from mixtures of same, or for the separation of at least one volatile component from a mixture with at least one non-volatile component.

This type of membrane separation operates on the basis of differences in permeation rate through certain dense, non-porous membranes. When the mixture to be separated is brought into contact with the membrane as a liquid, the process is called pervaporation. If the mixture is gaseous, the term "vapor permeation" is often applied. The present invention applies to both processes, but in the present specification, for the sake of brevity, the word pervaporation will be used to represent both processes. In both cases, one side of the membrane faces the fluid mixture while the other side is exposed to a vacuum or a carrier gas, which reduces the partial pressure of the permeable substance and thereby provides the driving force for permeation.

In passing through the membrane, a substance is first sorbed or absorbed into the membrane, then it diffuses through the membrane, and finally emerges as a gas on the low pressure side of the membrane. Different substances will permeate at different rates according to the chemistry of the membrane material and the prevailing operating conditions interacting with it. Some membranes favor the permeation of water over organic substances: these are termed "hydrophilic". Those favoring organics over water are termed "hydrophobic". Other membranes are designed to separate different species of organic substances.

The components of the fluid that pass through the membrane comprise the "permeate" and those that do not pass comprise the "retentate." The valuable fraction from the process may be the retentate or the permeate or in some cases both may be valuable.

Even mixtures such as azeotropes can be effectively separated by pervaporation, which is not possible utilizing thermodynamic vapor-liquid equilibria, such as in distillation processes. Numerous mixtures, e.g. water and ethanol, water and isopropanol, chloroform and hexane, water and tetrahydrofuran, water and dioxane, methanol and acetone, methanol and benzene, methanol and methylacetate, ethanol and ethylacetate, ethanol and cyclohexane, and butanol and heptane, which vaporize azeotropically when certain concentration limits are reached, can be separated by pervaporation.

U.S. Pat. No. 5,536,405 which issued Jul. 16, 1996 to Myrna et al. discloses a stacked membrane disk assembly which is located in a pressure vessel. This is typical of many commercial apparatus, which require pressure vessels to operate. Additionally, many pervaporation processes are operated at elevated temperatures, e.g. 100° C. Apart from the capital expense of pressure vessels, one of the disadvantages of having a pressure vessel is that the vessel needs to be dismantled when repairs are required to be performed on the membrane disk assembly which is inside the vessel. The down-time for dismantling, replacing disks or the disk assembly and then reassembling the apparatus can be as long as a day or more.

U.S. Pat. No. 5,620,605 which issued Apr. 15, 1997 to Jens K. Moller discloses an apparatus having membrane cassettes which may be operated with vacuum on the permeate side of the membrane and atmospheric pressure on the retentate side of the membrane. However, this is a huge and complex apparatus that would be very difficult and time consuming to repair should some of the membrane cassettes fail.

SUMMARY OF THE INVENTION

The present invention concerns an apparatus for the arrangement of membranes in a module and, in particular, a plate module for the separation of mixtures by a pervaporation process, wherein the module is simple and inexpensive and very easily and quickly replaced if required.

According to one aspect of the invention, there is provided a module for pervaporation or vapor permeation comprising a central, axial permeate removal tube having a wall with at least one inlet opening therein. At least one separator element is mounted on the permeate removal tube adjacent to the inlet opening. The separator element includes a permeate transport plate having a transverse opening therethrough for the passage of the permeate removal tube through the permeate transport plate. The permeate transport plate also defines fluid passages disposed radially relative to the permeate removal tube and communicating with the inlet opening therein. A pervaporation membrane envelops the permeate transport plate. Annular sealing rings are located concentrically about the permeate removal tube in engagement with the pervaporation membrane, so that fluid has to pass through the pervaporation membrane to enter the permeate removal tube inlet opening.

According to another aspect of the invention, there is provided apparatus for performing pervaporation or vapor permeation separation of fluids. The apparatus comprises a solution tank for containing fluid to be separated. A separator module is located in the tank. The separator module has a central, axial permeate removal tube extending from the tank. The permeate removal tube has a wall with at least one inlet opening therein. At least one separator element is mounted on the permeate removal tube adjacent to the inlet opening. The separator element includes a permeate transport plate having fluid passages communicating with the inlet opening. A pervaporation membrane envelops the permeate transport plate and sealing rings engage the pervaporation membrane, so that fluid entering the permeate removal tube has to pass through the pervaporation membrane. A permeate tank is located outside the solution tank and is connected to the permeate removal tube, and a vacuum pump is connected to the permeate tank to apply vacuum to the tank and the permeate removal tube.

According to yet another aspect of the invention, there is provided a method of separating fluids by pervaporation or vapor permeation comprising the steps of providing a separator module having an envelope of pervaporation material with a supporting permeate transport located therein and a permeate removal tube communicating with the inside of the envelope. The envelope is surrounded with fluid to be separated, the fluid being neither pressurized nor under vacuum. Vacuum is applied to the permeate removal tube to extract vapor permeate from the module.

BRIEF DESCRIPTION OF THE DRAWINGS

Preferred embodiments of the invention will now be described, by way of example, with reference to the accompanying drawings, in which.

DETAILED DESCRIPTION OF PREFERRED EMBODIMENTS

Figure 1:
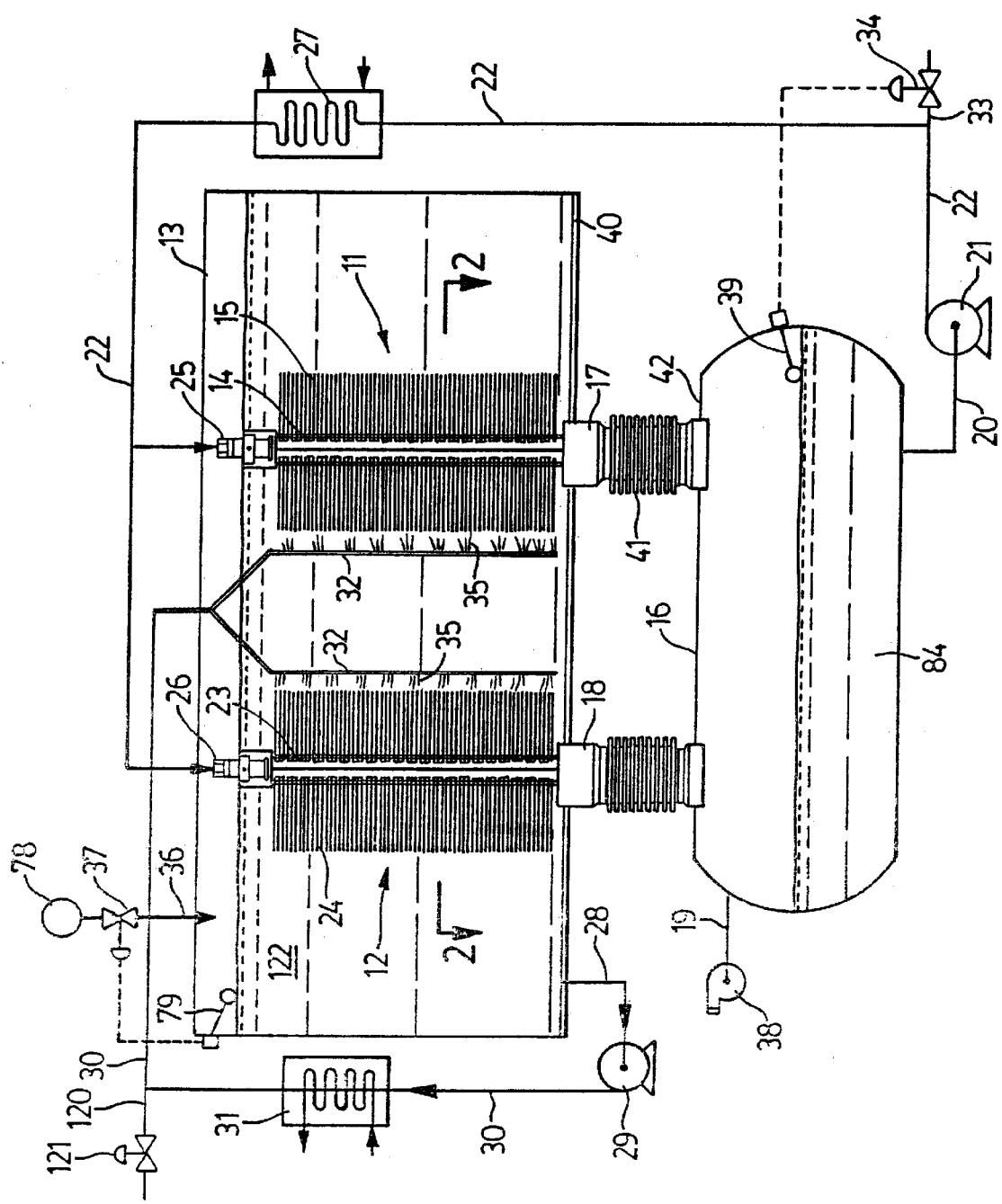
FIG. 1 is a schematic representation of a preferred embodiment of an apparatus useful in the present invention, including an assembled unit having a plurality of separation modules.

Referring firstly to FIG. 1, two separator modules 11 and 12 are shown located inside a solution tank 13, although only one separation module could be used, if desired. Separator module 11 comprises an axial permeate removal tube 14 having a plurality of separator elements 15 mounted thereon. Separator module 12 is similarly constructed, with an axial permeate removal tube 23 and separator elements 24. The construction of the separator elements and their attachment to the axial tube will be described in detail hereinafter. Separator modules 11 and 12 are connected to a permeate tank 16 by means of sockets 17 and 18 respectively. A pipe 19 leads from an upper part of permeate tank 16 to a vacuum pump 38.

A pipe 20 leads from the bottom of permeate tank 16 to a recirculating pump 21 and thence to recirculating line 22. Recirculating line 22 leads, via chiller 27, to inlets 25 and 26 which are attached to the tops of axial permeate removal tubes 14 and 23 respectively. Recirculating line 22 has a take-off line 33 which has a control valve 34 therein. Permeate tank 16 has a level controller 39 therein which controls the opening and closing of control valve 34.

A pipe 28 leads from the bottom of solution tank 13 to a recirculating pump 29 and thence to recirculating line 30. Recirculating line 30 leads, via heat exchanger 31, to branch inlet lines 32 which lead down beside separator modules 11 and 12. Inlet lines 32 have a plurality of nozzles 35 for injecting solution between separator elements 15, 24 to help prevent concentration polarization, as will be discussed further below. Another way to prevent concentration polarization is to rotate separator modules 11 and 12, and to facilitate this, sockets 17,18 and connectors 47 (see FIG. 4) could be modified to permit this rotation and even drive the modules. Recirculating line 30 also has a take-off branch line 120 and valve 121 for the withdrawal of processed retentate or solution 122 from solution tank 13. Solution tank 13 has a fresh or make-up solution inlet pipe 36 which is connected, via control valve 37 to a fresh solution source 78. Solution tank 13 has a level controller 79 therein which controls the opening and closing of control valve 37.

Figure 2:
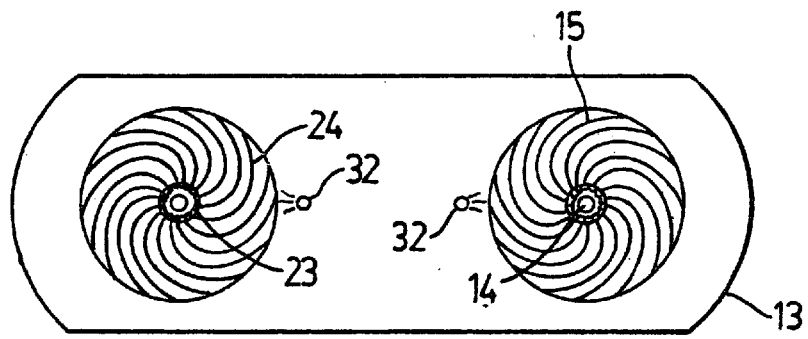
FIG. 2 is a sectional view taken along lines 2—2 of FIG. 1, showing the stacks of separation elements of the separation modules.

FIG. 2 is a horizontal sectional view of solution tank 13, showing axial tubes 14 and 23 and associated separator elements 15 and 24 respectively.

Figure 3:
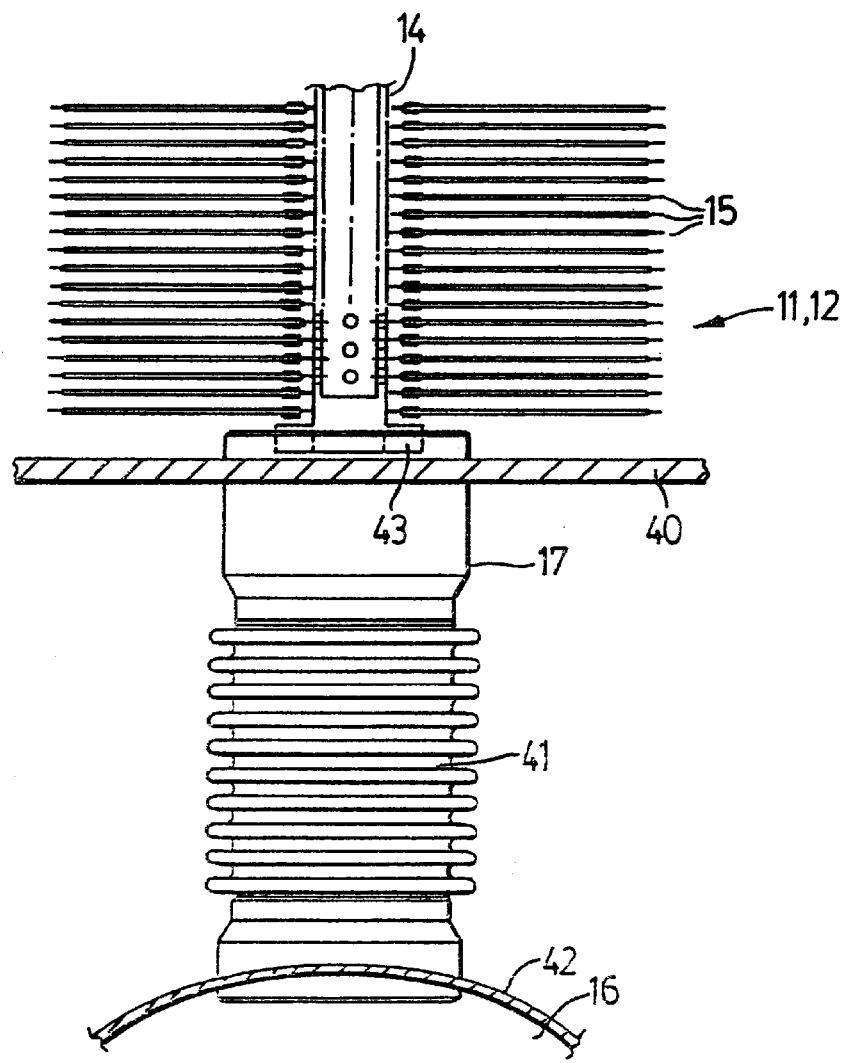
FIG. 3 is an enlarged a front view of the connection between the separator modules and a socket which is attached to a permeate tank.

FIG. 3 is a combined front view of socket 17 and a cross-sectional view of a lower portion of a stack of separator elements 15 mounted on axial permeate removal tube 14. It is not necessary that a physical tube be used for permeate removal tube 14 as long as a tubular conduit central to the stack of separator elements permits flow of permeate therethrough. Socket 17 comprises a flexible tubular element 41 which protrudes, at the upper end, through an aperture in the bottom 40 of the solution tank 13, and protrudes, at the lower end, through the wall 42 of the permeate tank 16. There is a fluid-tight seal between socket 17 and the bottom 40 of solution tank 13. Also, there is a fluid-tight seal between socket 17 and the wall 42 of permeate tank 16.

Figure 4:
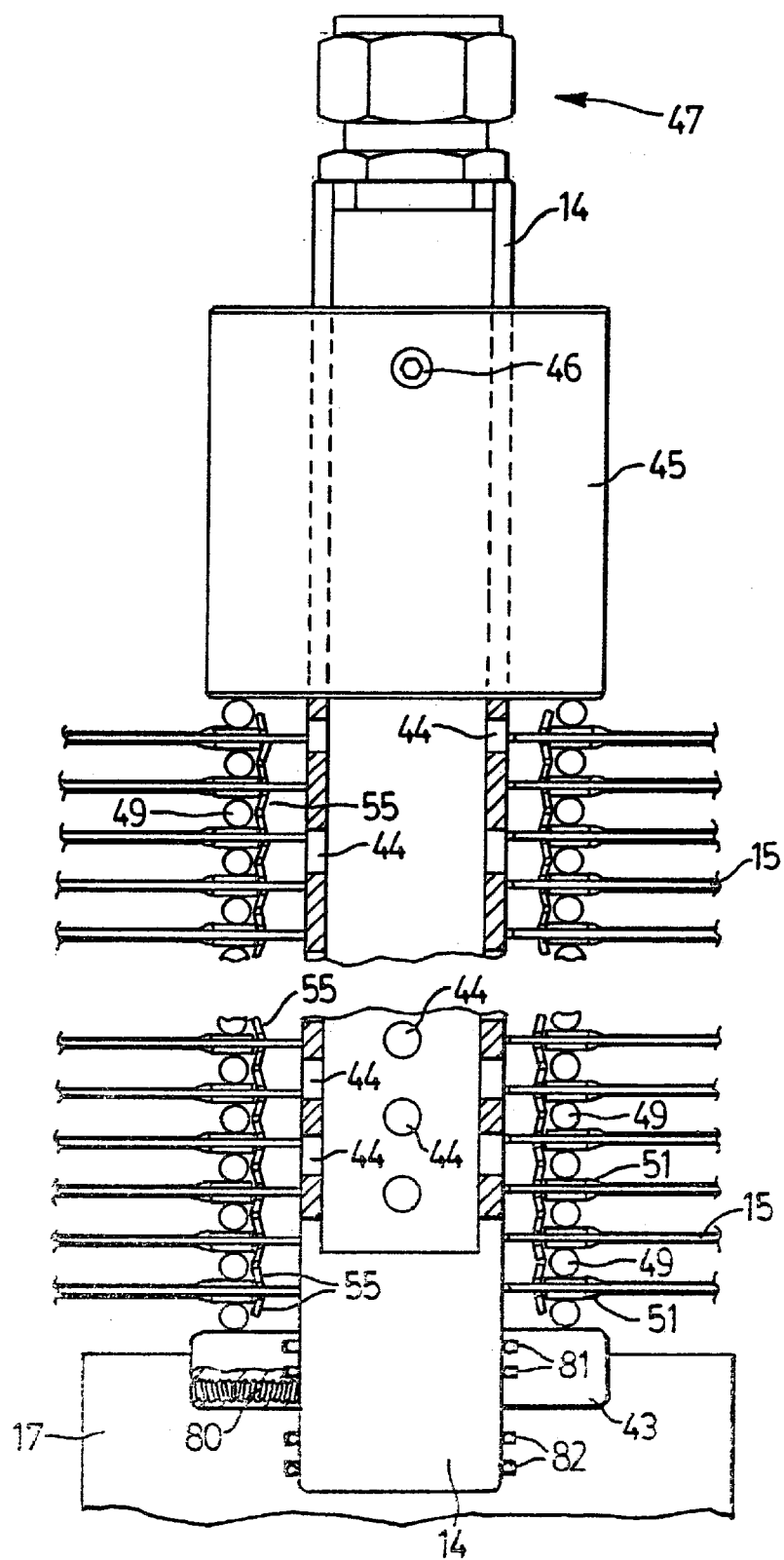
FIG. 4 is a cut-away sectional view of upper and lower portions of a stack of separator elements located about an axial tube for the permeate, also showing an upper inlet connector and a lower connection to a socket.

FIG. 4 shows the arrangement of axial permeate removal tube 14 and a stack of separator elements 15 mounted thereon. Axial permeate removal tube 14 is cut-away in the middle section so that apertures 44 are more clearly shown. The bottom of axial permeate removal tube 14 has a retaining collar 43 held in position on tube 14 by a set screw 80. Collar 43 seats inside socket 17 with a fluid-tight seal produced by O-rings 81. The lower end of tube 14 also has O-rings 82 to provide a fluid-fight seal with socket 17.

The upper end of axial permeate removal tube 14 has a retaining collar 45 secured thereto by a set screw 46. The top of axial permeate removal tube 14 has an inlet compression fitting or quick-connect coupling or connector 47 attached thereto. Inlet connector 47 connects to recirculating line 22 (not shown in FIG. 4 but shown in FIG. 1).

Figure 5:
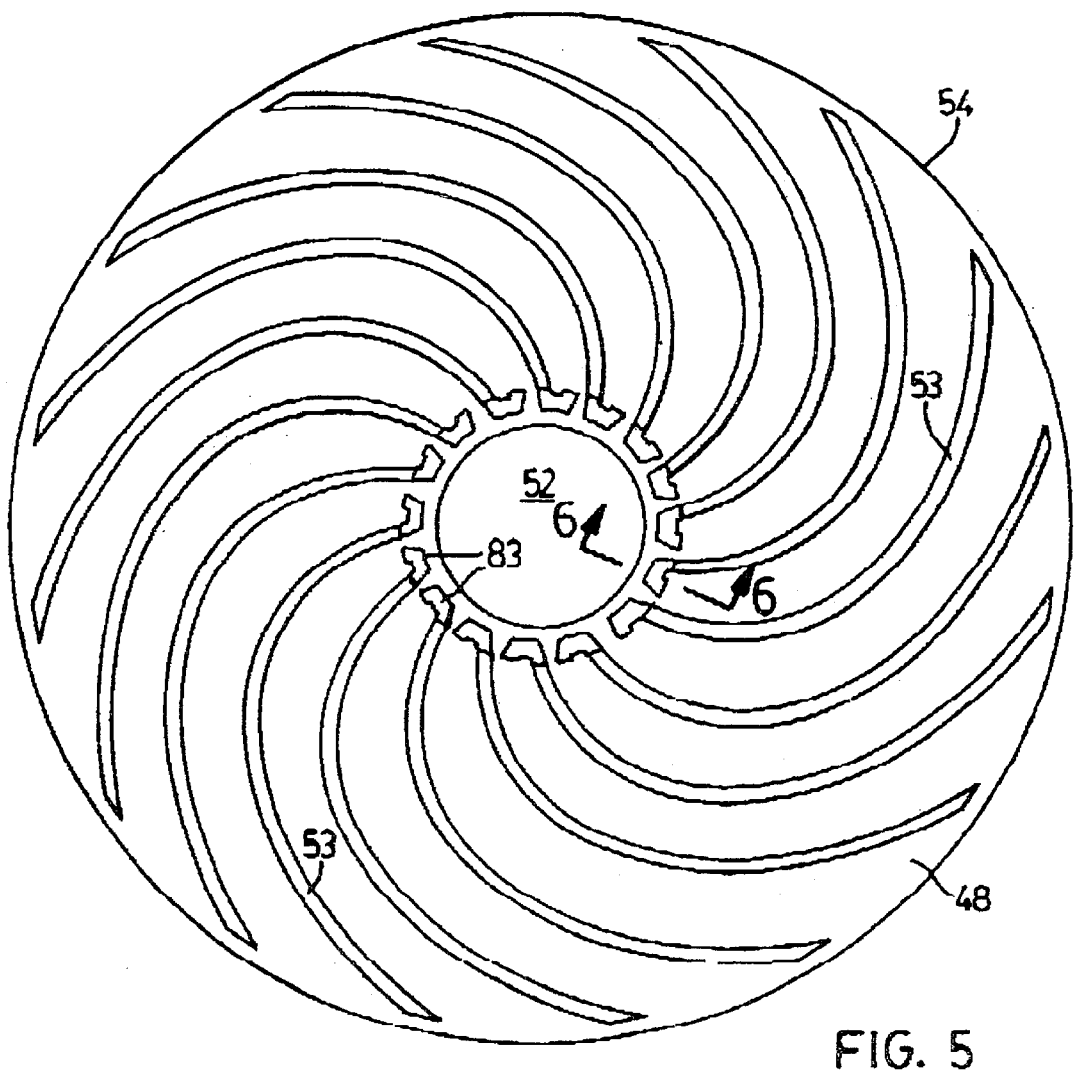
FIG. 5 is a plan view of a permeate transport plate used inside the separator elements.
Figure 6:
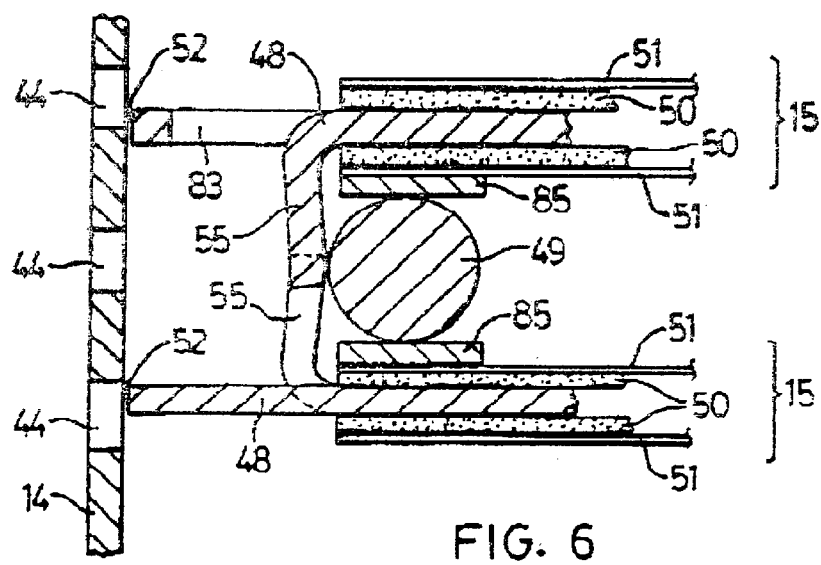
FIG. 6 is an enlarged sectional view taken along lines 6—6 of FIG. 5.

Referring next to FIGS. 4, 5 and 6, a plurality of separator elements 15 surround axial permeate removal tube 14, in a stack. Each separator element 15 includes a distribution plate or permeate transport plate 48 which has two functions: 1) it provides mechanical support to a membrane envelope 51 covering transport plate 48, and 2) it serves as a conduit for rarified permeate gases as they flow toward the central permeate removal tube 14. The simplest embodiment would be a permeate transport plate constructed of a rigid porous substance such as sintered steel. The permeate removal tube 14 could be made of the same type of material.

A preferred embodiment uses an inexpensive laser cut permeate transport plate 48 (seen in detail FIGS. 5 and 6), which is sandwiched between two fluid distribution layers 50, e.g. felt, as shown in cross-section in FIG. 6. The felts are then covered with a pervaporation membrane 51. There may be 30 to 50, or more separator elements in a stack.

Permeate transport plate 48 preferably is circular, as shown in FIG. 5. Permeate transport plate 48 has an axial aperture or opening 52 which is sized to fit reasonably snugly around axial permeate removal tube 14. Permeate transport plate 48 has a plurality of fluid passageways or slots 53 which extend from close to aperture 52 to the periphery 54 of plate 48. Preferably, the passageways 53 are in the shape of an involute or spiral curve or a polar parabola. Passageways 53 have inner distal enlargements 83 having a periphery including transverse tabs 55. There is one tab 55 for every fluid passageway or slot 53. There are an even number of passageways 53 surrounding axial aperture 52. This provides an even number of tabs 55. In use, tabs 55 are alternately bent upwards and downwards and form a means for holding O-rings 49 in place, as shown best in FIG. 6.

As will be seen in FIG. 6, separator elements 15, including permeate transport plates 48, are stacked on axial permeate removal tube 14. Axial permeate removal tube 14 has a plurality of apertures 44 along its length. Apertures 44 are arranged in a helical pattern around tube 14, but they could be longitudinally arranged slots, if desired. Adjacent separator elements 15 are separated from one another, and a liquid tight seal between adjacent permeate transport plates 48 is effected by sandwiching O-rings 49 therebetween. Flat gaskets could be used in place of O-rings. Concentric, annular washers 85 prevent the O-rings from pushing the membranes 51 and layers 50 into slots 53. Tabs 55 hold O-rings 49 in a substantially coaxial circular configuration around axial permeate removal tube 14. Fluid seals between O-rings 49 and separator elements 15 is effected by squeezing the O-rings 49 and separator elements 15 between collar 43 at the lower end of axial permeate removal tube 14, and retaining collar 45, at the upper end of axial permeate removal tube 14.

Typically, the axial permeate removal tube 14 may have an outer diameter of about one tenth to one sixth the diameter of the permeate transport plate (preferably one eighth) and there may be 30 or more separator elements 15, e.g. 50 separator elements, in a stack, with each separator element 15 being about 50 cm in diameter. There may be up to 20 or more separation modules 11, 12 in a solution tank 13, or these could be as few as one.

In operation, solution tank 13 (see FIG. 1) is filled with raw feed solution 122. A vacuum is pulled in permeate tank 16 by means of vacuum pump 38. Permeate gases are condensed by direct contact with a stream of chilled liquid permeate conveyed by pipe 22. There may also be a condenser (not shown) to condense any vapor that is removed by the vacuum pump 38. Permeate drawn through membranes 51 flows through fluid distribution layers 50 into passageways 53. The permeate gas is then drawn along passageways 53 towards axial permeate removal tubes 14, 23 through enlargements 83 and apertures 44. The permeate condenses inside permeate removal tubes 14, 23, as will be described further below, and the liquid permeate 84 then drops into permeate tank 16 where it accumulates.

Recycling some of the liquid permeate 84 through axial permeate removal tubes 14 and 23, via pump 21 and lines 20 and 22, increases the efficiency of the process. The cold liquid permeate assists in condensing or liquefying the gaseous permeate being drawn through separator elements 15 and 24. Permeate removal tubes 14, 23 thus become direct contact condensers. Preferably, the liquid permeate is sprayed or atomized as it enters tubes 14, 23 to maximize the condensation, but baffles or other types of fins could be placed inside permeate removal tubes 14, 23 for this purpose, if desired. The permeate preferably is cooled using chiller 27. Excess permeate 84 is withdrawn from the system through take-off line 33, using level controller 39 to control valve 34.

At the same time that the permeate is being drawn from the feed solution, retentate, of course is left behind in solution tank 13. This retentate can be removed from tank 13 in various ways, as described further below.

In order to prevent concentration polarization immediately adjacent to the pervaporation membranes 51, some turbulence in the solution adjacent to the membranes is required. Various methods can be used to do this including agitation, vibration, rocking the feed tank. In the embodiment shown in FIG. 1, nozzles 35 are used to produce jets of fluid impinging on separator elements 15, 24. Other novel methods, such as the rotation or the spinning of modules 11 and 12, or ultrasonic induction may be used as well. Fluid is supplied to nozzles 35 by being pumped by recirculation pump 29 from the bottom of solution tank 13, via recirculation line 30 and branch inlet lines 32, through nozzles 35 onto and between separator elements 15 and 24. The solution is preferably heated with heat exchanger 31, as the solution passes through recirculation line 30, to make up for heat lost by the latent heat of vaporization as the permeate vaporizes passing through membranes 51. If desired, chiller 27 and heat exchange 31 can be a combined unit, such as a heat pump. Other means for heating the solution may be utilized, e.g. heaters (not shown in the drawings) in solution tank 13.

In batch mode operation, pervaporation is allowed to continue until the solution 122 in feed tank 13 has reached the desired specification. At this point, solution 122 is the desired retentate. Tank 13 is then emptied through line 120 and refilled with fresh solution.

In continuous mode operation, finished product is continuously withdrawn through line 120 and control valve 121 while level controller 79 maintains fluid level in tank 13 by admitting feed through valve 37 from a feed source 78.

The behaviour of the permeate may be modified advantageously by the introduction of a suitable permeate capture substance. For example, triethylene glycol may be used to reduce the freezing point of an aqueous permeate, enabling low temperatures in the permeate circulation loop. The advantage here is a deeper vacuum, which improves both flux and separation factor.

Another example involves lithium bromide solution as an absorbent for aqueous permeate, which provides similar benefits at temperatures in the permeate circulation loop that are high enough 43° C. (111 F.) to obviate refrigeration.

Figure 7:
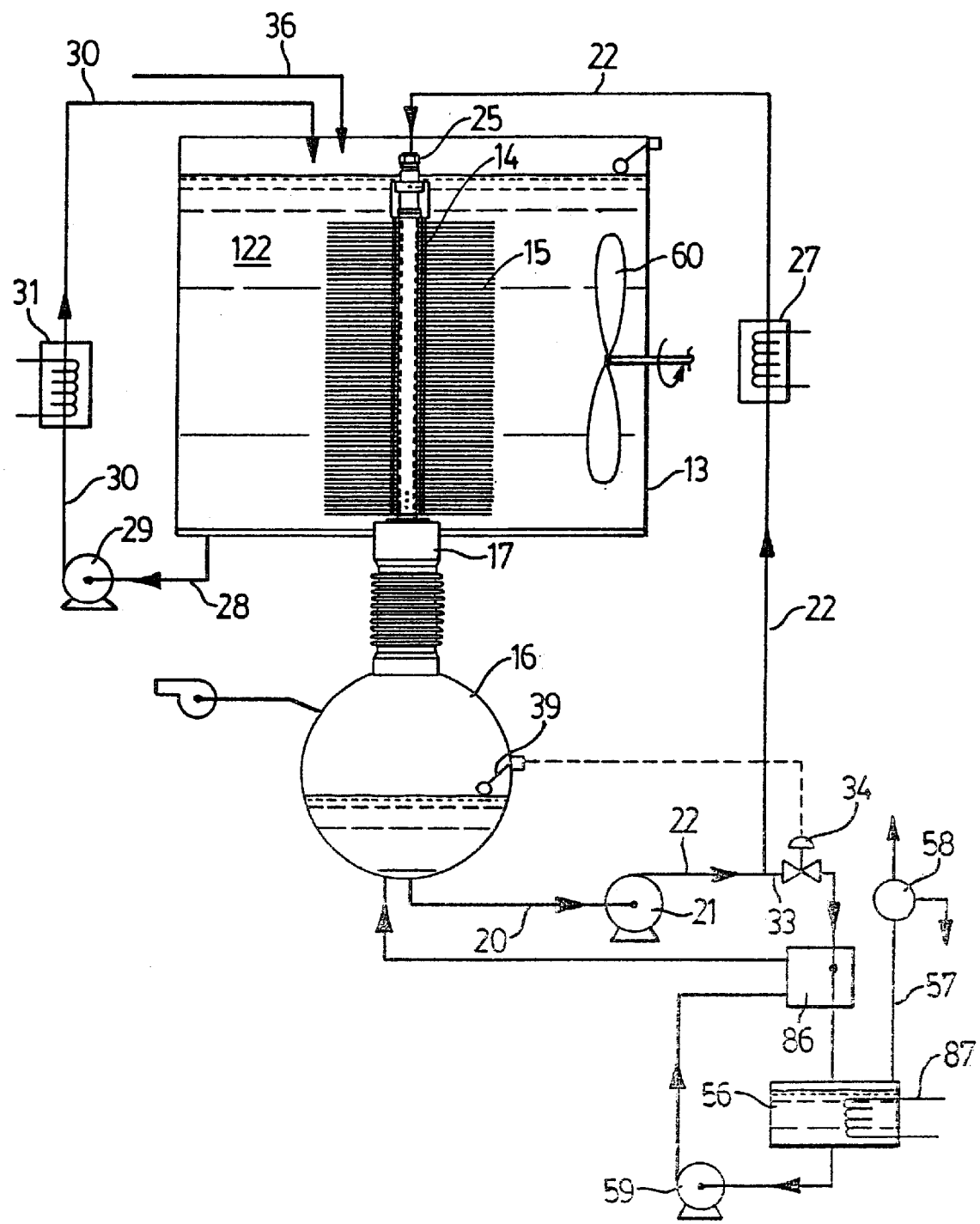
FIG. 7 is a schematic representation of another preferred embodiment of an apparatus according to the present invention, which is a hybrid system using absorption to augment the pervaporation.

FIG. 7 shows a preferred embodiment which is a hybrid system using absorption to augment the pervaporation process. In FIG. 7 and in the other embodiments described hereafter, like reference numerals are used to indicate components of the embodiments that are similar or common to more than one embodiment. Also, the apparatus of the present invention may advantageously be used to dry solutions such as isopropyl alcohol and water, where alcohol would be the retentate and the water would be the permeate. In the example that follow, this is the type of pervaporation process being discussed unless indicated otherwise. In the FIG. 7 embodiment, permeate tank 16 contains a solution of the permeate capture substance (e.g. triethylene glycol) diluted with liquid permeate. This solution is circulated by pump 21 through heat exchanger or chiller 27 where excess heat is rejected. The cooled solution completes its circuit through the permeate removal tubes of the pervaporation modules, then drops down into the permeate tank 16. Take-off line 33 passes through heat exchanger 86 and into a desorber or tank 56 which is heated, e.g. to about 150° C., with heating coils 87. Here the captured permeate is boiled off and the permeate capture fluid is reconcentrated. Liquid in tank 56 is pumped by pump 59 back to permeate tank 16 through heat exchanger 86. Vaporized permeate from tank 56 escapes via line 57 to condenser 58.

The present invention may be run with the solution 122 in solution tank 13 at relatively low temperatures, e.g. 50 to 70° C. and at or near atmospheric pressure. Running at such low temperatures and pressures is beneficial from an energy economy standpoint and from the standpoint of increasing the life of the membranes 51. This feature also applies to the other embodiments described herein.

Another feature of the embodiment of FIG. 7 is the method used to reduce concentration polarization. This is done using an impeller 60 in the solution tank 13 to force the solution to flow between separator elements 15.

Figure 8:
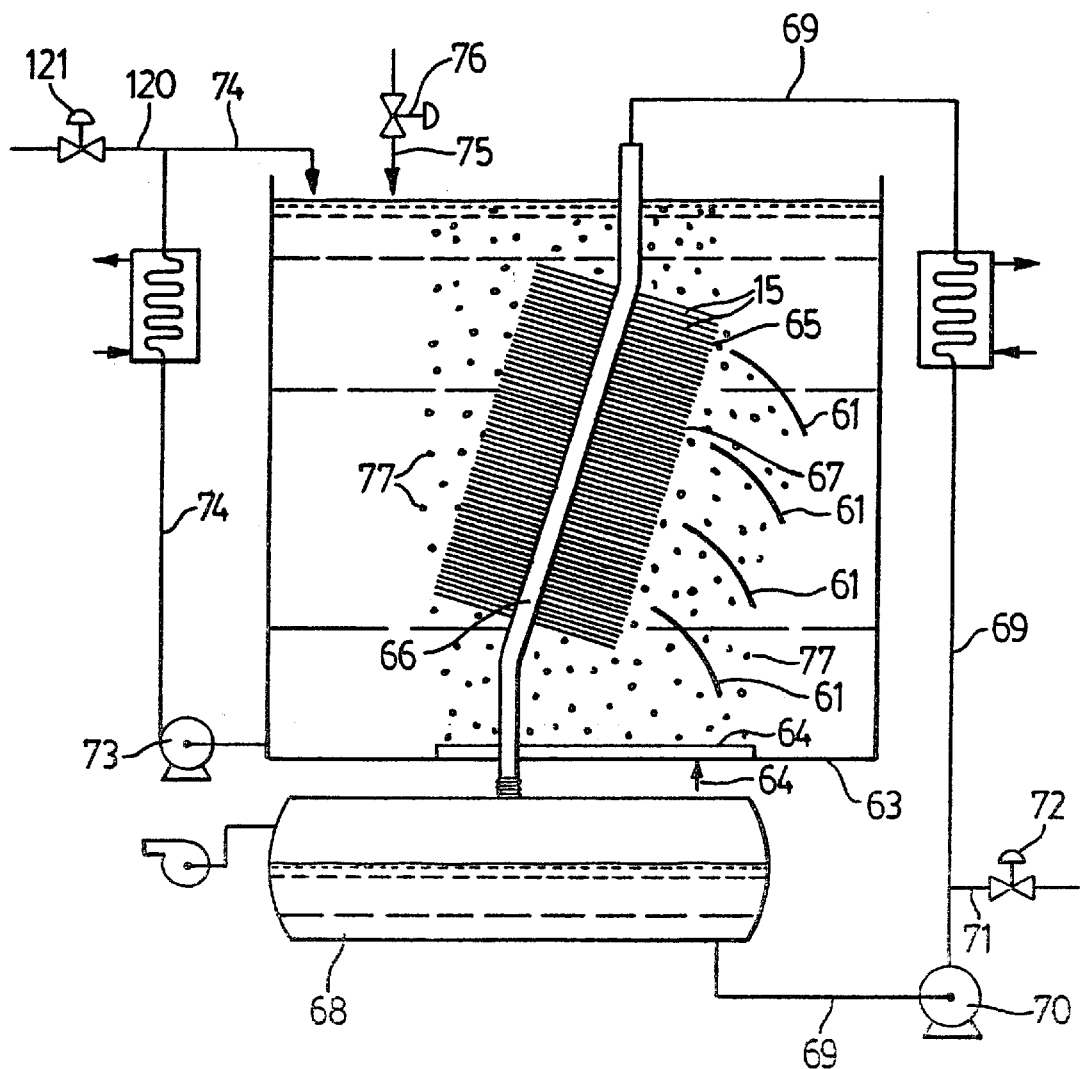
FIG. 8 is a schematic representation of another preferred embodiment of an apparatus useful in the present invention, in which vapor is bubbled through the solution which is to be separated by pervaporation, and which has an inclined separator module.

Referring next to FIG. 8, it will be seen that separator module 65 includes an axial permeate removal tube 66 and separator elements 67 that are inclined, so that the axial tube is about 10 to 20 degrees from the vertical. FIG. 8 shows a solution tank 63 with a vapor inlet/diffuser 64 through which vapor is bubbled. The inclined separator module 65 facilitates the passage of vapor bubbles 77 around separator elements 67 to sweep retentate away from the pervaporation membranes to reduce concentration polarization. Vanes 61 are provided to help direct the bubbles between separator elements 15. The vapor may be vaporized feed material or an inert gas. The lower end of axial tube 66 is bent to permit liquid permeate to drain into permeate tank 68. The upper end of axial tube 66 is connected to recirculation line 69. Permeate is recirculated through line 69, by means of pump 70. The permeate removal tube 66 includes appropriate internal baffles (not shown) to prevent liquid permeate from flowing into separator elements 67. Excess permeate is bled off through take-off or bleed line 71 and is controlled by valve 72, essentially as was explained in relation to the apparatus of FIG. 1. Solution may be recirculated in solution tank 63 by means of pump 73 and recirculation line 74. Fresh solution may be added through inlet 75, which is controlled by valve 76, and retentate 122 may be removed using line 120 as in the embodiment shown in FIG. 1.

In operation, solution vapor is bubbled through inlet/diffuser 64 into the solution in solution tank 63. Bubbles 77 of the vapor rise in the solution and sweep up between separator elements 67 to the surface of the solution. The bubbles tend to sweep retentate away from the surface of the pervaporation membranes. In addition, as the bubbles travel through the solution, heat is transferred to the solution, thus aiding in providing heat replacement to the solution.

By way of example, using a 6 cm diameter axial permeate removal tube and a stack of 50 separator elements in a module 50 cm in diameter and assuming a water flux of 0.2 kg/ m2.h, then about 4 kg/h of water are removed by a single module. Thus, an 8-unit assembly would remove about 31 kg/h which is equivalent to an hourly dehydration rate of about 330 U.S. gallons of Isopropyl alcohol at 3.5% water down to less than 0.5%.

This capacity can be further increased by use of more units or by operating the same number of units at enhanced feed solution conditions that result in higher flux.

Figure 9:
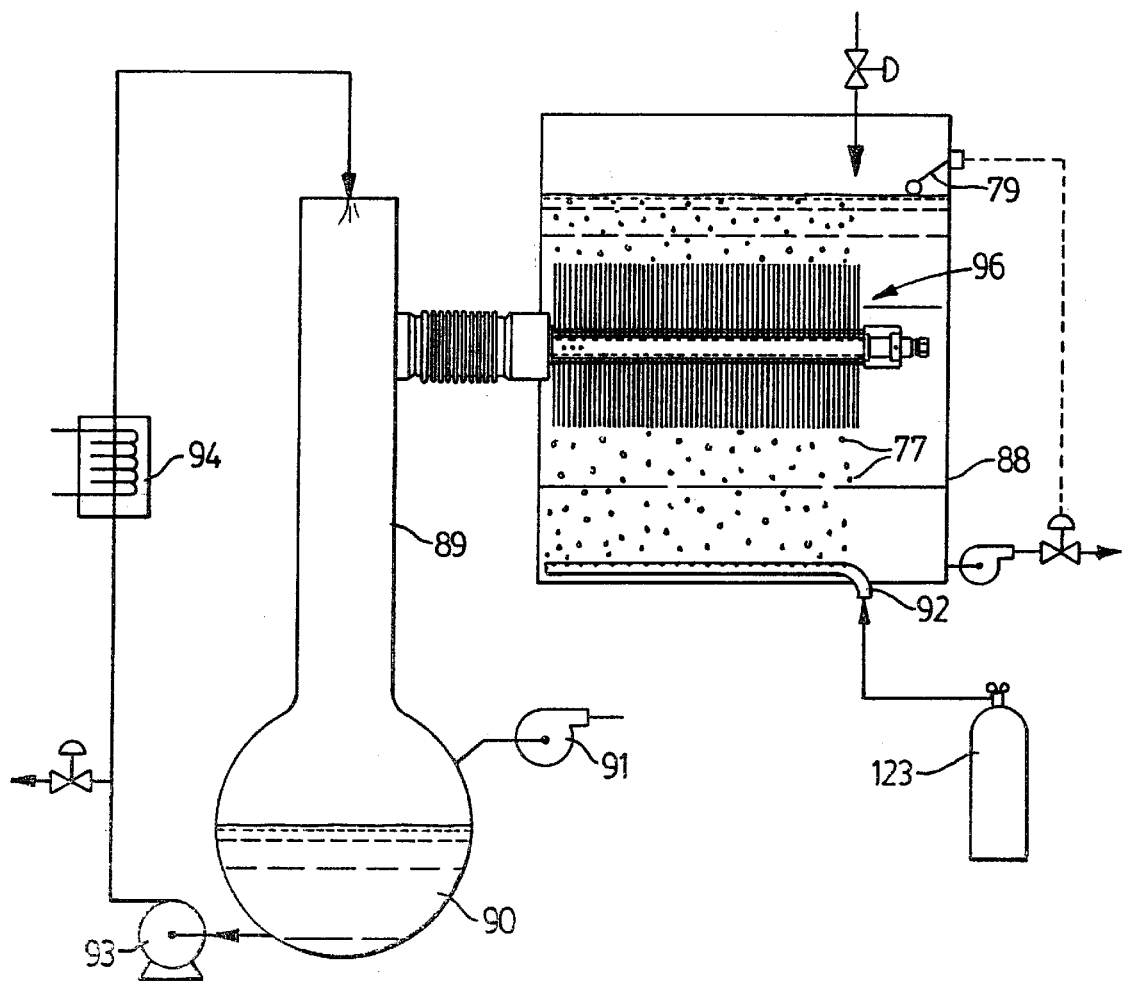
FIG. 9 is a schematic representation of yet another preferred embodiment of the present invention, which is also a hybrid system using distillation to augment the pervaporation.

Referring next to FIG. 9, another preferred embodiment of the invention is shown where the separator module 96 is located horizontally inside solution tank 88. Permeate vapor is drawn from separator module 96 into a condensation tower 89 located on top of or forming part of permeate tank 90. Vacuum pump 91 creates a vacuum inside permeate tank 90.

A vapor is delivered to a vapor inlet/diffuser 92 from a vapor supply 123, such as an inert gas cylinder, where it is bubbled up through separator module 96 to prevent concentration polarization in a manner similar to the embodiment shown in FIG. 8.

A recirculation pump 93 pumps liquid permeate through a chiller 94 to be used for direct contact condensation inside condensation tower 89. The liquid permeate can be sprayed or atomized, or baffles or venturies can be used inside condensation tower 89 to increase the efficiency of the condensation.

Figure 10:
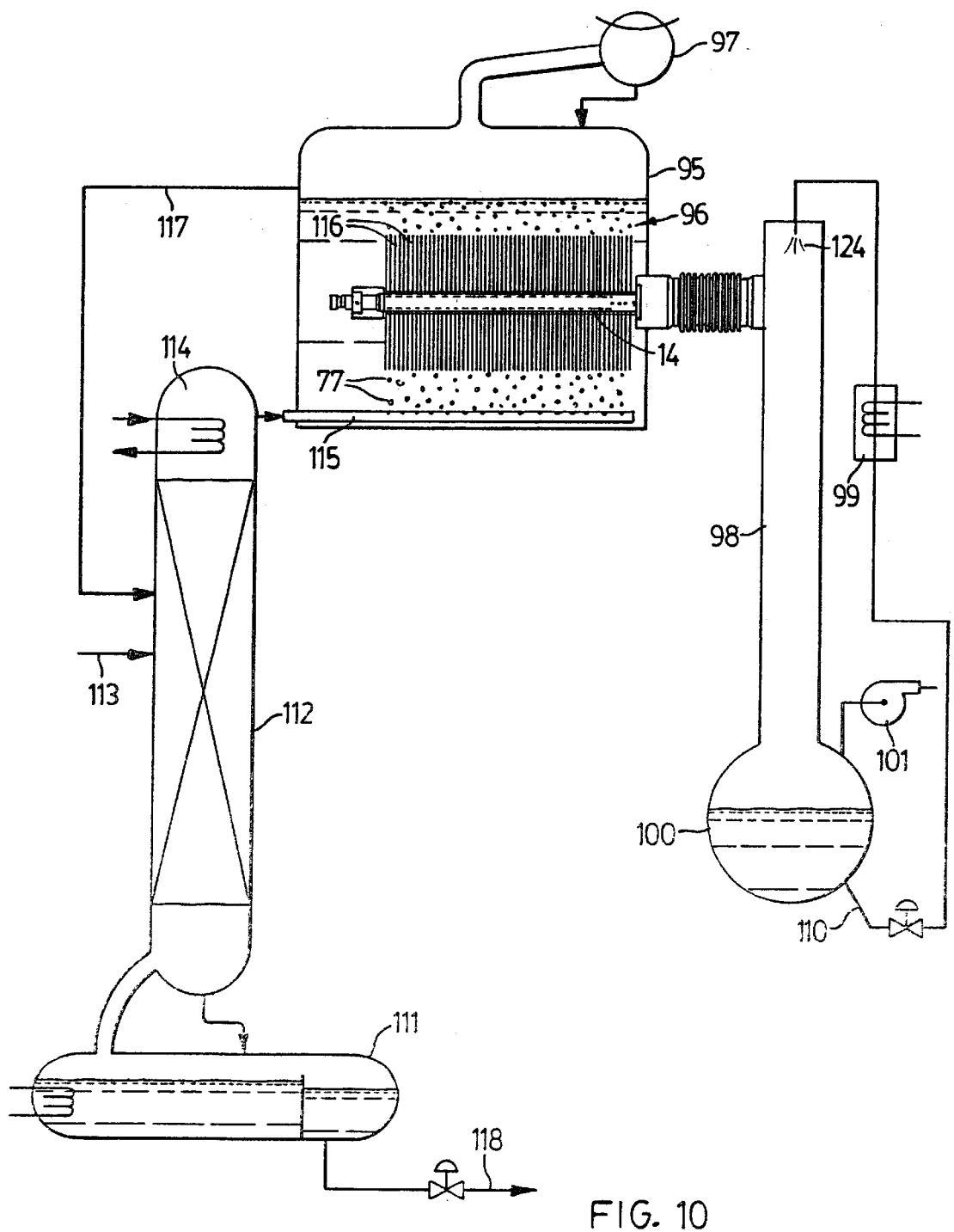
FIG. 10 is a schematic representation of yet another preferred embodiment of the present invention having a distillation column to augment the operation of the pervaporation apparatus.

Referring next to FIG. 10, a solution tank 95 having a horizontal separator module 96 is shown in another preferred embodiment. This embodiment is also a hybrid system that uses distillation to augment the pervaporation. A retentate condenser 97 is located in the top of solution tank 95. Permeate vapor passes from permeate removal tube 14 into a tower 98 where it is condensed by direct contact with chilled permeate and the condensed permeate passes into permeate tank 100. Vacuum is applied to permeate tank 100 by a vacuum pump 101, and a take-off or bleed line 110 delivers liquid permeate from tank 100 to a spray head or atomizing device 124. A chiller 99 is used to cool the liquid permeate.

A partial reboiler 111 and a distillation column 112 comprise a distillation apparatus. A solution to be separated is supplied to distillation column 112 through a feed line 113. A portion of the boil up is condensed by reflux condenser 114. Vapor from distillation column 112 has a higher concentration of the desired permeate than is the case with the feed solution in feed line 113, and this vapor is delivered to a vapor inlet/diffuser 115 where it is bubbled up through the separator elements 116 of separator module 96. Solution tank 95 overflows back to distillation column 112 through a return line 117. The position of entry of this overflow stream must roughly match its composition to that of the liquid in column 112. The enrichment of the feed by distillation column 112 results in enhanced membrane performance. For example, a hydrophilic membrane may show a fifteen-fold increase in flux when operated with 3.5% water in the feed, as opposed to 0.5%. The separation factor is also improved.

As an example of the operation of the embodiment of FIG. 10, a stream of isopropyl alcohol with a 5% water content can be dried to 0.5% water. As a design decision, the solution inside solution tank 95 is maintained at 3.5% water. This specifies the composition of the overflow stream through return line 117 back to distillation column 112. There is an azeotrope of 87.4% isopropyl alcohol and 12.6% water that has a lower boiling point than the isopropyl alcohol itself. A short, inexpensive distillation column 112 with low reflux rates will produce an overhead distillate rich in the azeotrope. This will produce a distillate that exceeds 7% water, and in this way, the concentration of water in solution tank 95 can be maintained at the desired 3.5% level with moderate boil-up rates. Dry isopropyl alcohol is delivered continuously from reboiler 111 through output line 118.

Figure 11:
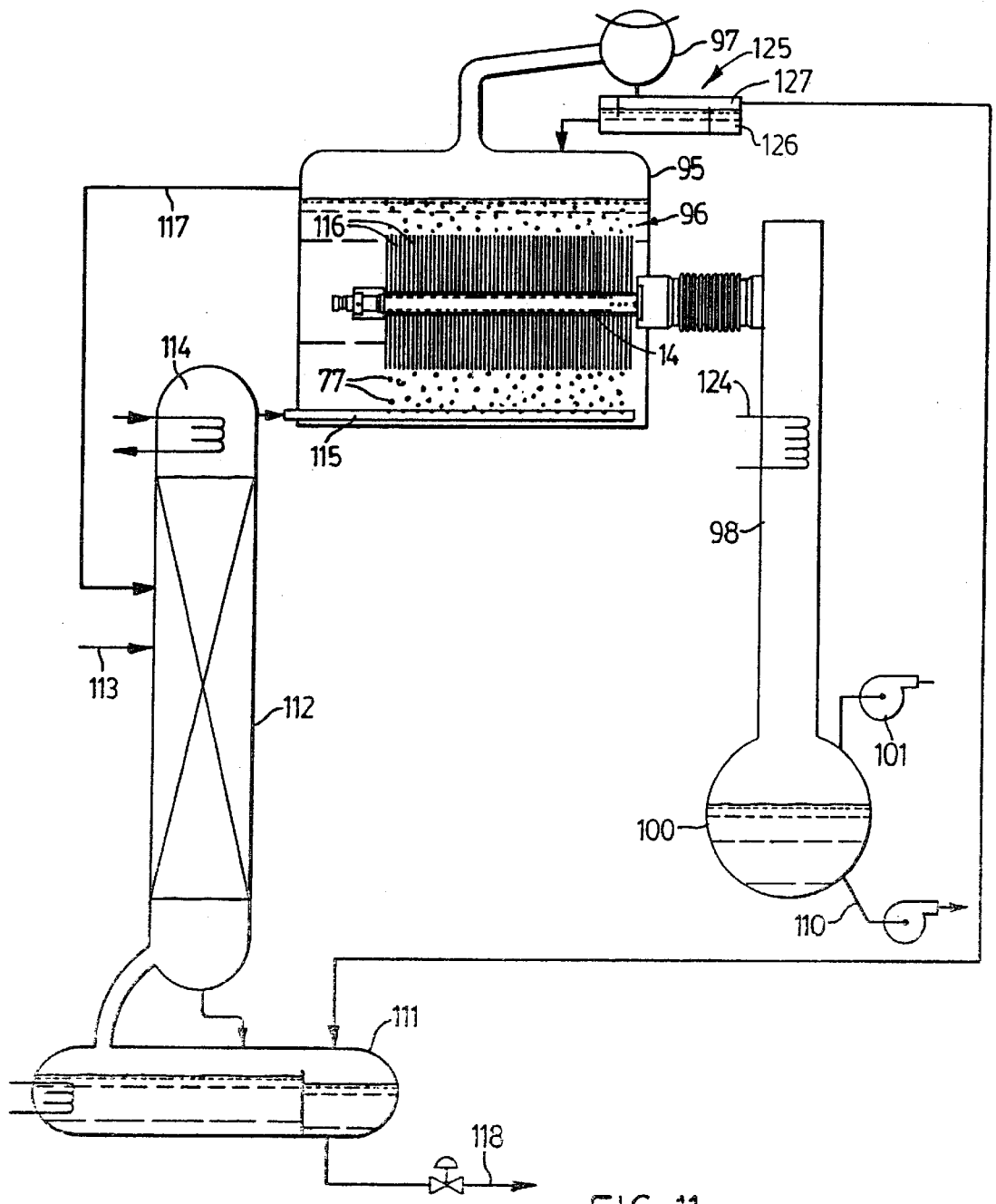
FIG. 11 is a schematic representation of yet another preferred embodiment of the present invention, which is also a hybrid system using phase separation to augment the pervaporation.

FIG. 11 shows some modifications to the embodiment of FIG. 10 and an alternative hybrid system where distillation as well as phase separation is used in addition to pervaporation. Also, in the embodiment shown in FIG. 11, a condenser 124 is used to condense the permeate vapor in tower 98 rather than using direct contact condensation with the chilled liquid permeate. Such a condenser 124 could also be employed in the embodiment shown in FIG. 10.

In the FIG. 11 embodiment, an entrainer, such as hexane, cyclohexane or heptane is added to reboiler 111. This produces a high water tertiary azeotrope that on condensing in retentate condenser 97, separates into two phases. For example, where isopropyl alcohol is being dried in the apparatus of FIG. 11, the condensate from retentate condenser 97 separates in settling tank 125 into a bottom water layer 126 and a hydrocarbon or alcohol top layer 127. The water layer 126 is fed back to solution tank 95 to increase the flux rate therein, and the hydrocarbon layer is fed back to partial reboiler 111.

Figure 12:
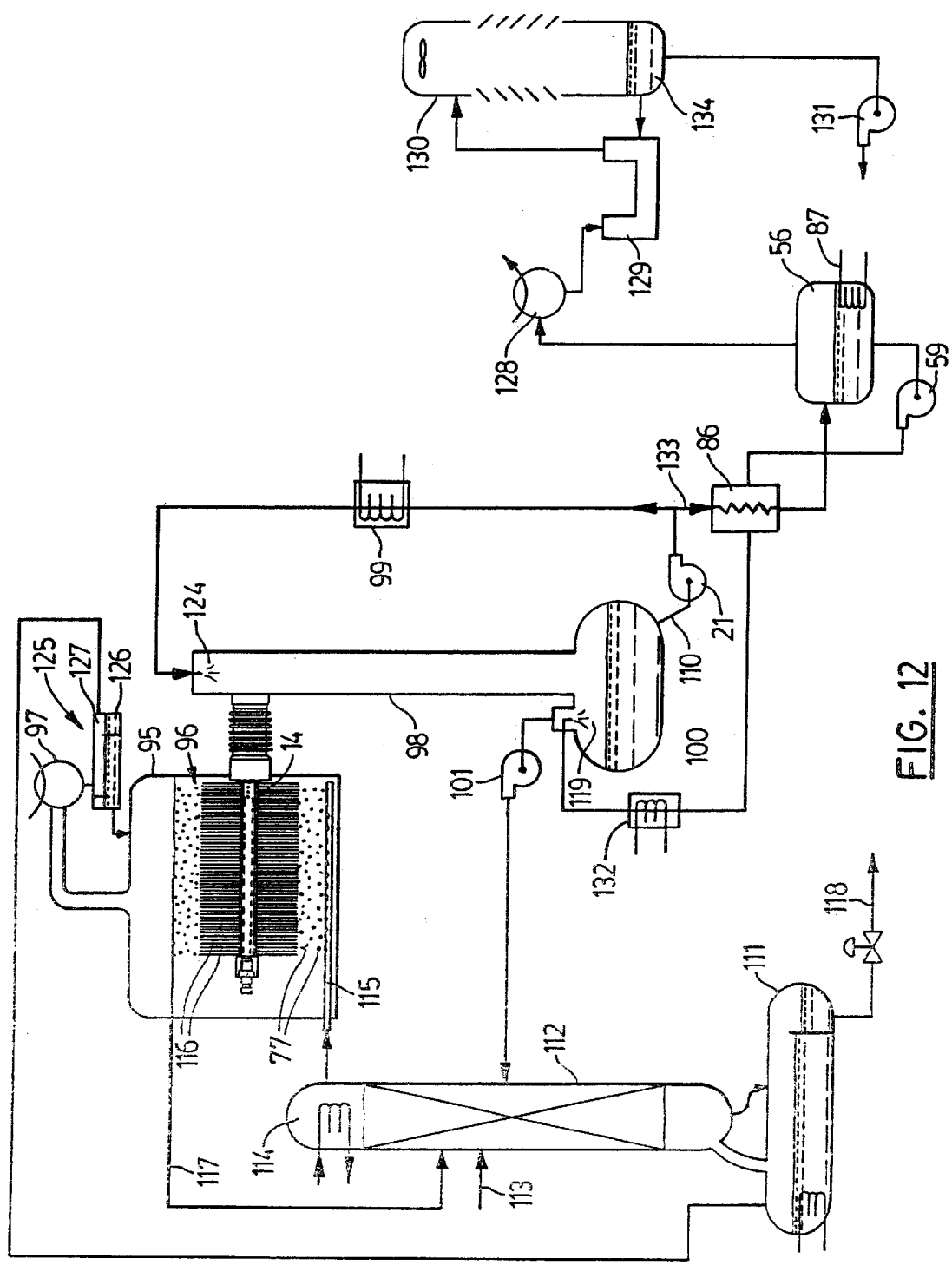
FIG. 12 is a schematic representation of still another preferred embodiment of the present invention, which is also a hybrid system using distillation, phase separation and absorption to augment the pervaporation.

FIG. 12 shows yet another hybrid type separation system where distillation, phase separation and absorption are used to augment the pervaporation system. This arrangement is specifically for hydrophilic membranes dehydrating organic liquids. The FIG. 12 embodiment incorporates features shown in FIG. 7 and FIG. 11, which combine to increase process yield to nearly 100% while eliminating a waste stream.

The apparatus on the feed side of the membrane uses azeotropic distillation with phase separation to enrich the bubble tank liquid in water content. Vapor bubbles 77 maintain the temperature of the solution in the tank and minimize concentration polarization.

The embodiment of FIG. 12 further utilizes a hygroscopic fluid such as triethylene glycol or lithium bromide brine to capture water (permeate) by absorption. This substance is circulated by pump 21 and tank 100, through heat exchanger 99, to direct contact absorber or condenser 124. The capture substance has a much higher affinity for water than for any organic substance that may permeate through the membrane. Thus, these organic contaminants will remain in the gaseous state and will be removed from tank 100 by the dry vacuum pump 101. FIG. 12 shows the vacuum pump 101 discharging back to the distillation column 112, where the organics will be recovered as product. Gases entering the vacuum pump 101 must pass through a counter-current stream 119 of cool freshly-regenerated absorbent, ensuring minimal water content.

One benefit of this system is improved system yield. Another benefit is that the water stream leaving the system through desorber vessel 56 contains very little organic contamination.

As an example, consider the dehydration of isopropyl alcohol mentioned above. The 31 kg/h of water removed by pervaporation will typically be accompanied by 1.5 kg/h (roughly 5%) of isopropyl alcohol, representing a potentially costly wastewater disposal problem. With an appropriately chosen absorbent, most of this alcohol will be recycled through the vacuum pump 101. If 1.43 kg/h of isopropyl alcohol enters vacuum pump 101 at 7.6 Torr, the actual gas flow rate would be 42 actual CFM, which is attainable by practically sized equipment. The consequent purification of the water effluent makes it suitable for use as cooling tower make-up.

In FIG. 12 a side stream 133 from pump 21 passes through heat exchanger 86 into desorber tank 56 which is heated by heating coils 87. Captured permeate is then boiled off and the permeate capture fluid is reconcentrated. The reconcentrated liquid is pumped by pump 59 back to permeate tank 100 through heat exchangers 86 and 132 bringing its temperature slightly below that in tank 100.

While it is possible to reconcentrate some absorbents at atmospheric pressure, FIG. 12 shows condenser 128 and liquid ring vacuum pump 129 as accessories that reduce the pressure in desorber tank 56 to about 75 Torr. This measure keeps the temperature requirement for desorbing low, thus enhancing energy efficiency. The service liquid for the liquid ring vacuum pump 129 comes from the sump 134 of evaporative cooling tower 130. The vacuum pump 129 discharges into the cooling tower 130. The vacuum pump 129 discharges into the cooling tower 130, which through pump 131 supplies cooling water to heat exchanges 114, 97, 99, 132 and 128.

The terms "comprising/comprises" when used in this specification are taken to specify the presence of the stated features, integers, steps or components but do not preclude the presence or addition of one or more other features, integers, steps, components or groups thereof.

As will be apparent to those skilled in the art in the light of the foregoing disclosure, many alterations and modifications are possible in the practice of this invention without departing from the spirit or scope thereof. The foregoing description is of the preferred embodiments by way of example only, and is not to limit the scope of the invention.

What is claimed is:

1. A module for pervaporation or vapor permeation comprising: a central, axial permeate removal tube having a wall with at least one inlet opening therein; at least one separator element mounted on the permeate removal tube adjacent to the inlet opening; the separator element including a permeate transport plate having a transverse opening therethrough for the passage of the permeate removal tube through the permeate transport plate, the permeate transport plate also defining fluid passages disposed radially relative to the permeate removal tube and communicating with said inlet opening therein; a pervaporation membrane enveloping the permeate transport plate; and annular sealing rings located concentrically about the permeate removal tube in engagement with the pervaporation membrane, so that fluid has to pass through the pervaporation membrane to enter the permeate removal tube inlet opening.

2. A module as claimed in claim 1 wherein the permeate transport plate fluid passages are in the form of slots in the shape of involute curves.

3. A module as claimed in claim 2 wherein the slots have inner distal enlargements having a periphery including a transverse tab.

4. A module as claimed in claim 3 wherein the pervaporation membrane extends radially inwardly to said tabs, and wherein the annular sealing rings are located radially outwardly of said tabs to be held in position by the tabs.

5. A module as claimed in claim 1 wherein the separator element further comprises a fluid distribution layer located between the permeate transport plate and the pervaporation membrane.

6. A module as claimed in claim 5 wherein the fluid distribution layer is formed of felt.

7. A module as claimed in claim 1 wherein said separator element is a first element, and further comprising a plurality of identical separator elements stacked longitudinally along the axial permeate removal tube.

8. A module as claimed in claim 7 wherein said sealing rings are in the form of O-rings sandwiched between adjacent separator elements.

9. A module as claimed in claim 8 wherein the permeate transport plate fluid passages are in the form of slots in the shape of involute curves.

10. A module as claimed in claim 8 wherein the permeate transport plate fluid passages are in the form of slots in the plate, the slots having inner distal enlargements having a periphery including a transverse tab, the pervaporation membrane extending radially inwardly to said tabs, and the O-rings being located radially outwardly of said tabs.

11. A module as claimed in claim 8 wherein the permeate removal tube wall has a plurality of longitudinally spaced-apart inlet openings formed therein.

12. Apparatus for performing pervaporation or vapor permeation separation of fluids, comprising: a solution tank for containing fluid to be separated, a separator module located in the tank; the separator module having a central, axial permeate removal tube extending from the tank, the permeate removal tube having a wall with at least one inlet opening therein; at least one separator element mounted on the permeate removal tube adjacent to the inlet opening, the separator element including a permeate transport plate having fluid passages communicating with said inlet opening, a pervaporation membrane enveloping the permeate transport plate and sealing rings engaging the pervaporation membrane, so that fluid entering the permeate removal tube has to pass through the pervaporation membrane; a permeate tank located outside the solution tank and being connected to the permeate removal tube; and a vacuum pump connected to the permeate tank to apply a vacuum to said tank and the permeate removal tube.

13. Apparatus as claimed in claim 12 wherein the solution tank includes means defining a vent to the atmosphere, so that the tank is at atmospheric pressure.

14. Apparatus as claimed in claim 13 and further comprising a releasable coupling for connecting the separator module to the permeate tank.

15. Apparatus as claimed in claim 12 and further comprising condenser means adapted to condense permeate passing through the at least one separator element.

16. Apparatus as claimed in claim 15 wherein the condenser means includes means for spraying fluid through the permeate removal tube for direct contact condensation of the permeate therein.

17. Apparatus as claimed in claim 16 wherein the means for spraying fluid includes a recirculation line and a pump for delivering condensed permeate in the permeate tank to the permeate removal tube.

18. Apparatus as claimed in claim 17 and further comprising a cooling circuit coupled to the permeate tank, the cooling circuit containing a cooling fluid with a lower freezing point than the condensed permeate and being miscible with condensed permeate, the cooling circuit including means for boiling off the permeate from the cooling fluid.

19. Apparatus as claimed in claim 15 wherein the condenser means includes a cooling circuit connected to the permeate tank, the cooling circuit including an inlet conduit for receiving condensed permeate from the permeate tank, a chiller for cooling the condensed permeate, and an outlet conduit and a pump for spraying chilled condensed permeate onto the permeate coming from the permeate removal tube.

20. Apparatus as claimed in claim 12 wherein said separator element is a first element, and further comprising a plurality of identical separator elements stacked longitudinally along the axial permeate removal tube.

21. Apparatus as claimed in claim 20 wherein the separator module is oriented vertically in the solution tank, and further comprising a pump and spray nozzles for spraying solution through the separator elements.

22. Apparatus as claimed in claim 20 wherein the separator module is oriented non-vertically in the solution tank, and further comprising means for bubbling vapor between the separator elements.

23. Apparatus as claimed in claim 12 and further comprising a distillation column for receiving the fluid to be separated, means for delivering vapor from the distillation column to the solution tank, means for delivering overflow fluid from the solution tank back to the distillation column, and a reboiler for receiving retentate from the distillation column and delivering vaporized retentate back to the distillation column.

24. Apparatus as claimed in claim 23 and further comprising a vapor inlet/diffuser located in the solution tank to receive vapor from the distillation column and bubble the vapor around the separator element.

25. Apparatus as claimed in claim 23 and further comprising a desorber tank and conduit means coupled between the permeate tank and the desorber tank for circulating fluid between said tanks, the desorber tank having heating means for boiling off permeate from the fluid therein.

26. Apparatus as claimed in claim 25 and further comprising a retentate condenser communicating with the solution tank for receiving and condensing vapor from the solution tank.

27. Apparatus as claimed in claim 12 and further comprising a desorber tank and conduit means coupled between the permeate tank and the desorber tank for circulating fluid between said tanks, the desorber tank having heating means for boiling off permeate from the fluid therein.

28. Apparatus as claimed in claim 12 and further comprising a retentate condenser communicating with the solution tank for receiving and condensing vapor from the solution tank.

29. Apparatus as claimed in claim 28 and further comprising a settling tank communicating with the retentate condenser for receiving condensed retentate therefrom.

30. A method of separating fluids by pervaporation or vapor permeation comprising the steps of: providing a separator element having an envelope of pervaporation material with a supporting permeate transport plate located therein and a permeate removal tube communicating with the inside of the envelope; surrounding the separator element with fluid to be separated, said fluid being neither pressurized nor under vacuum; and applying a vacuum to the permeate removal tube to extract vapor permeate from the inside of the envelope.

31. A method as claimed in claim 30 and further comprising the step of condensing the vapor permeate coming from the permeate removal tube to form liquid permeate.

32. A method as claimed in claim 31 wherein the permeate is condensed by cooling liquid permeate and directly contacting the vapor permeate with said liquid permeate.

33. A method as claimed in claim 32 and further comprising the step of dissolving the liquid permeate in a carrier liquid with a lower freezing temperature than the liquid permeate, and using said carrier and permeate solution for contacting the vapor permeate.

34. A method as claimed in claim 30 and further comprising the step of directing jets of the fluid to be separated around the separation module to reduce concentration polarization.

35. A method as claimed in claim 30 and further comprising the step of bubbling permeate vapor around the module to reduce concentration polarization.

36. A method as claimed in claim 30 and further comprising the step of distilling the fluid to be separated to produce vapor with a higher concentration of the desired permeate, and then feeding said vapor to the fluid surrounding the envelope.

37. A method as claimed in claim 30 and further comprising the step of adding heat energy to the fluid surrounding the envelope.

* * * * *